US012701312B2

(12) United States Patent
Siwek et al.

(10) Patent No.: US 12,701,312 B2
(45) Date of Patent: Aug. 4, 2026

(54) HINGED ELECTRONIC SUPPORT FOR IMAGE ACQUISITION DEVICE HAVING A PLURALITY OF CONNECTED FLAPS INCLUDING SENSORS, ASSEMBLY COMPRISING SUCH A SUPPORT, AND IMAGE ACQUISITION DEVICE COMPRISING SUCH AN ASSEMBLY

(71) Applicant: IDEMIA IDENTITY & SECURITY FRANCE, Courbevoie (FR)

(72) Inventors: Jean-François Siwek, Courbevoie (FR); Ngoc-Son-Dorian Nguyen, Courbevoie (FR); Jean-Michel Teyrol, Courbevoie (FR); Rahma Ait Bouhou, Courbevoie (FR)

(73) Assignee: IDEMIA PUBLIC SECURITY FRANCE, Courbevoie (FR)

( * ) Notice: Subject to any disclaimer, the term of this patent is extended or adjusted under 35 U.S.C. 154(b) by 117 days.

(21) Appl. No.: 18/392,024

(22) Filed: Dec. 21, 2023

(65) Prior Publication Data

US 2024/0214662 A1    Jun. 27, 2024

(30) Foreign Application Priority Data

Dec. 23, 2022    (FR) ..................................... 22 14376

(51) Int. Cl.
*H04N 23/55*          (2023.01)
*H04N 23/54*          (2023.01)
*H04N 23/58*          (2023.01)

(52) U.S. Cl.
CPC ............. *H04N 23/55* (2023.01); *H04N 23/54* (2023.01); *H04N 23/58* (2023.01)

(58) Field of Classification Search
CPC ........ H04N 23/55; H04N 23/54; H04N 23/58; H04N 23/90
See application file for complete search history.

(56) References Cited

U.S. PATENT DOCUMENTS

| | | | | |
|---|---|---|---|---|
| 9,411,365 B1 * | 8/2016 | Tanner | ................. | G06F 1/1683 |
| 9,442,363 B2 * | 9/2016 | Seo | ......................... | G03B 17/14 |
| 9,686,468 B2 * | 6/2017 | Eromäki | .............. | H04N 23/667 |
| 10,616,563 B2 * | 4/2020 | Taylor | .................... | H04N 23/90 |

(Continued)

FOREIGN PATENT DOCUMENTS

EP        3 046 077 A1    7/2016

OTHER PUBLICATIONS

Preliminary French Search Report issued Aug. 7, 2023 in French Application 22 14376 filed on Dec. 23, 2022, 10 pages (with Written Opinion).

*Primary Examiner* — Padma Haliyur
(74) *Attorney, Agent, or Firm* — Oblon, McClelland, Maier & Neustadt, L.L.P.

(57)                    ABSTRACT

An electronic support having a body which includes at least one first flap and one second flap, the first flap and the second flap each comprising a top face and a bottom face, the top face of the first flap and the top face of the second flap being configured to each support an image acquisition unit sensor, the electronic support further having at least one hinge, the at least one hinge being configured to link the first flap and the second flap to one another, the top face of the first flap being inclined by an angle "a" with respect to the top face of the second flap, the angle "a" being greater than 180°.

16 Claims, 5 Drawing Sheets

(56) References Cited

U.S. PATENT DOCUMENTS

| | | | |
|---|---|---|---|
| 10,788,865 | B1 * | 9/2020 | Files .......................... G06F 1/26 |
| 2015/0010192 | A1 * | 1/2015 | Lee .......................... H04R 1/02 |
| | | | 381/365 |
| 2016/0197516 | A1 * | 7/2016 | Pike, II .................... H02J 7/35 |
| | | | 320/101 |
| 2016/0212408 | A1 | 7/2016 | Zhao et al. |
| 2017/0111578 | A1 * | 4/2017 | Eromäki ................ H04N 23/51 |
| 2017/0289527 | A1 * | 10/2017 | Taylor ................... H04N 23/90 |
| 2017/0366749 | A1 * | 12/2017 | Zolotov .............. H04N 13/239 |
| 2017/0374240 | A1 * | 12/2017 | Laroia ..................... H04N 5/04 |
| 2018/0139364 | A1 * | 5/2018 | Jannard ............... H04N 13/189 |
| 2020/0186710 | A1 * | 6/2020 | Sheikh ................ H04N 23/667 |
| 2020/0244878 | A1 * | 7/2020 | Yang ..................... H04N 23/45 |
| 2021/0368099 | A1 * | 11/2021 | Nguyen ................ G06F 3/1423 |
| 2022/0337747 | A1 | 10/2022 | Sheikh et al. |

* cited by examiner

HINGED ELECTRONIC SUPPORT FOR IMAGE ACQUISITION DEVICE HAVING A PLURALITY OF CONNECTED FLAPS INCLUDING SENSORS, ASSEMBLY COMPRISING SUCH A SUPPORT, AND IMAGE ACQUISITION DEVICE COMPRISING SUCH AN ASSEMBLY

CROSS-REFERENCE TO RELATED APPLICATION

The present application claims priority to French Patent Application No. 22 14376, filed on Dec. 23, 2022. The entire content of the foregoing is incorporated herein by reference.

The invention relates to an electronic support. It relates more particularly to an electronic support for at least two image acquisition units.

The invention applies, notably, to technical fields such as image acquisition systems for security, for the tracking and recognition of information, notably biometric, such as of the irises, of an individual, or notably for road following, such as a radar for vehicles.

An image acquisition system for the tracking and biometric recognition of an iris of an individual, immobile or moving, typically comprises a camera mounted parallel to a support on a visual axis of the camera, a first motor configured to orient the camera according to an axis of rotation considered as "vertical" allowing the camera to perform a horizontal rotational movement, called "panoramic", and a second motor configured to orient the camera according to an axis of rotation considered as "horizontal" allowing the camera to perform a vertical rotational movement, thus orienting its inclination, also called "tilt" movement.

In this system, the two rotational movements of the camera (panoramic and in inclination) with respect to the support can be combined to obtain a capture field in the form of a cone with rectangular base.

Now, at least one drawback with such an image acquisition system is to have a relatively significant bulk in the plane of the support resulting from the disposition of the camera parallel to the support. Another image acquisition system for the tracking and biometric recognition of an iris of an individual, immobile or moving, typically comprises a camera fixedly mounted and arranged at right angles to a support on the visual axis of the camera, a mirror positioned facing the camera and transversal to the visual axis of the camera, the mirror being motorised according to two axes of rotation with respect to the visual axis of the camera, thus allowing the mirror to perform a horizontal rotational movement, called "panoramic", and a vertical rotational movement, called "tilt".

In such a system, the two rotational movements of the mirror can be combined to obtain a capture field in the form of a cone with rectangular base.

In such a system, the camera typically comprises a lens and a sensor, to which the lens sends an image.

Such an image acquisition system offers the advantage of a relatively reduced bulk in the plane of the support with respect to the image acquisition system previously presented.

Nevertheless, at least one drawback of such an image acquisition system is to have a limited capture field, notably in comparison to the preceding image acquisition system presented.

Indeed, notably the horizontal rotational movement, called "panoramic", of the mirror with respect to the visual axis of the camera generates a rotation of the image reflected by the mirror with respect to the centre of the sensor of the camera.

The image reflected by the mirror is then no longer located on the same horizontal line of the sensor of the camera.

Thus, the greater the angle of rotation during the panoramic movement of the mirror, the greater the risk of obtaining an image, notably of the eyes and/or of the irises of an individual, that is partially or completely outside of the sensor of the camera. This is notably due to the fact that a camera sensor is typically of rectangular and non-circular format, and has a dimensioning that is standardised and generally limited in bulk.

Consequently, such a rotation of the image reflected by the mirror on the sensors during a panoramic movement creates a limitation of the capture field of the camera.

In addition, the image perceived by the sensor is then deformed. The rotation of the image reflected on the sensor of the camera then necessitates an additional step in the processing of the image supplied by the image acquisition system.

To at least partly overcome these drawbacks, an image acquisition system is for example proposed that comprises an image acquisition device configured to acquire at least one image on a visual axis, in which the image acquisition device comprises at least two image acquisition units whose optical axes diverge with respect to one another.

Such a disposition makes it possible to widen a visual field of the image acquisition system at least in one direction.

Such a disposition notably offers the advantage, for the tracking and the recognition of biometric information of an individual, of allowing an acquisition of the two irises of the individual simultaneously.

However, one difficulty is then how to keep the image acquisition units in position with respect to one another, while facilitating a synchronisation of the images captured by each of the image acquisition units. The present invention aims to at least partly mitigate these drawbacks, possibly leading to other advantages. To this end, according to a first aspect, an electronic support is proposed that comprises a body which comprises at least one first flap and one second flap, the first flap and the second flap each comprising a top face and a bottom face, the top face of the first flap and the top face of the second flap being configured to each support an image acquisition unit sensor, the electronic support further comprising at least one hinge, the at least one hinge being configured to link the first flap and the second flap to one another, the top face of the first flap being inclined by an angle "a" with respect to the top face of the second flap, the angle "a" being greater than 180°.

In an exemplary embodiment, the angle "a" is less than or equal to 220°.

In one embodiment, the electronic support comprises more than two flaps.

For example, the electronic support can comprise at least one third flap.

The third flap for example supports a third sensor.

For example, the electronic support can then comprise a second hinge by which the third flap is linked to the second flap.

An electronic support with three flaps then forms a triptych. Such an electronic support, comprising at least three flaps each supporting a sensor, is for example suited to an application such as road radar multilane tracking.

In one embodiment, the at least one hinge is flexible. The flexibility of the at least one hinge thus allows at least the first flap and the second flap to form an angle "a" between them.

For example, the at least one hinge can be flexed, or be curved, or be folded.

In one embodiment, the at least one hinge has a thickness that is thinner than a thickness of the at least one first flap and one second flap.

A thinner thickness at the at least one hinge with respect to a thickness of the flaps makes it possible to locate a fold zone without necessitating any third-party element to form the at least one hinge.

The support can for example be formed from a single plate.

For example, the thinner thickness of the at least one hinge is produced by material removal, for example by machining, for example milling.

For example, the thinner thickness of the at least one hinge is produced by lamination.

In one embodiment, the at least one hinge, the first flap and the second flap are formed together of a single piece.

In one embodiment, the at least one hinge is further configured to electrically connect the first flap and the second flap to one another.

In one embodiment, at least one flap out of the first flap and the second flap comprises a connector configured to electrically connect the electronic support to an external unit.

In one embodiment, at least one flap out of the first flap and the second flap comprises a multiplexer configured to multiplex video signals originating from the sensors of the first flap and of the second flap and to transmit a single video signal to said connector.

In one embodiment, the electronic support is a printed circuit board.

The invention relates also, according to a second aspect, to an assembly comprising an electronic support, comprising all or part of the features described previously.

For example, the assembly comprises a lens support.

For example, the lens support is configured to support at least one first lens of a first image acquisition unit and one second lens of a second image acquisition unit.

For example, the lens support is configured to position at least the first lens of the first image acquisition unit facing the first sensor of the first image acquisition unit and the second lens of the second image acquisition unit facing the second sensor of the second image acquisition unit.

For example, the lens support is fixed to the first flap and the second flap by keeping the first flap inclined by the angle "a" with respect to the second flap.

The invention relates also, according to a third aspect, to an image acquisition device configured to acquire at least one image on a visual axis.

For example, the image acquisition device comprises an assembly as described previously.

For example, the image acquisition device comprises at least one first image acquisition unit and one second image acquisition unit, the first image acquisition unit comprising a first lens and the first sensor, which together define a first optical axis, and the second image acquisition unit comprising a second lens and the second sensor, which together define a second optical axis, the first and second optical axes, respectively of the first and second image acquisition units, diverging with respect to one another.

The invention, according to an exemplary embodiment, will be well understood and its advantages will become more apparent on reading the following detailed description, given in an indicative and nonlimiting manner, with reference to the attached drawings in which.

The elements that are identical represented in the above-mentioned figures are identified by identical numeric references.

Figure 1:
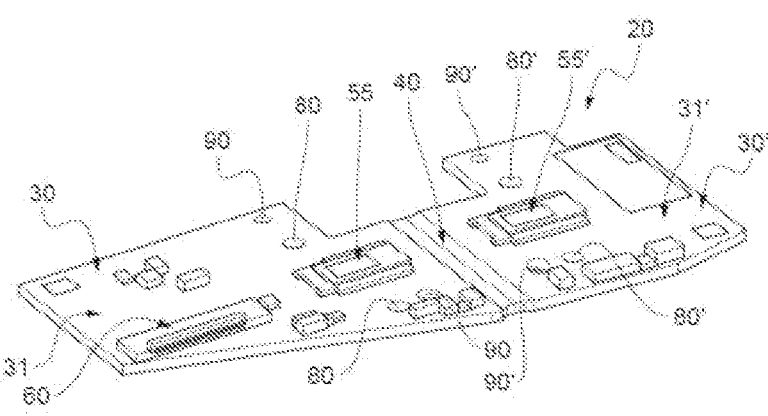
FIG. 1 represents a perspective top view of an electronic support according to an exemplary embodiment of the invention.
Figure 2:
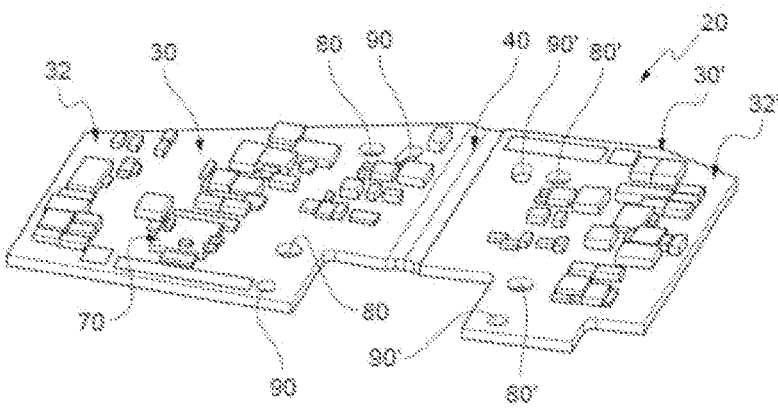
FIG. 2 represents a perspective bottom view of the electronic support according to the exemplary embodiment of FIG. 1.
Figure 3:
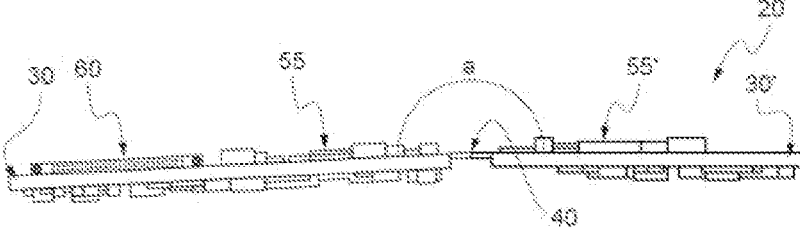
FIG. 3 represents a profile view of the electronic support according to the exemplary embodiment of FIG. 1.

FIGS. 1 to 3 present an electronic support 20 according to an exemplary embodiment of the invention. The electronic support 20 is, here, a printed circuit board, or PCB.

The electronic support 20 primarily comprises a body, which here comprises a first flap 30 and a second flap 30'.

The first flap 30 and the second flap 30' each comprise a top face and a bottom face.

The top face and the bottom face of each flap define between them a thickness of the electronic support 20.

In this case, the first flap 30 here comprises a top face 31 and a bottom face 32, and the second flap 30' here comprises a top face 31' and a bottom face 32'.

Figure 8:
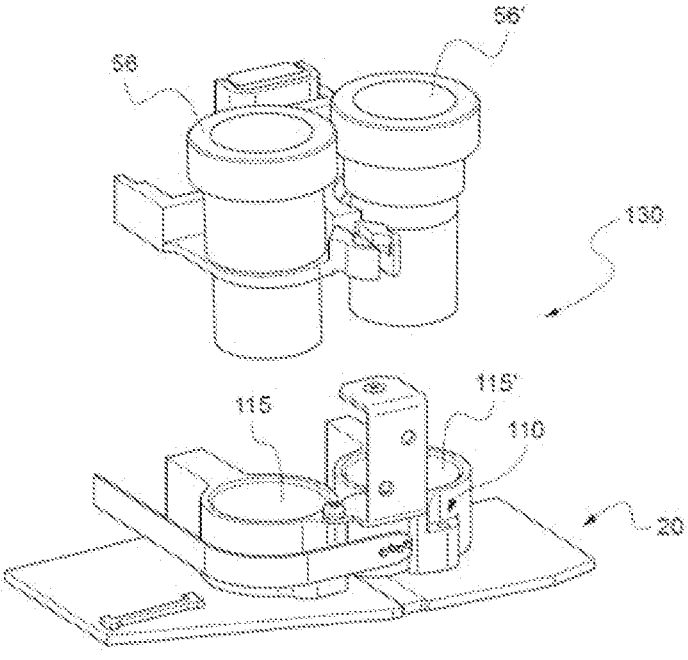
FIG. 8 represents an exploded view of an example of image acquisition device comprising the assembly of FIG. 6.
Figure 9:
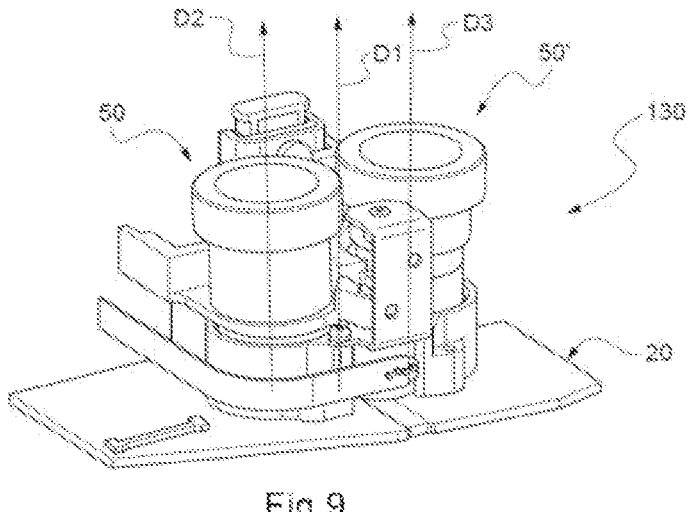
FIG. 9 represents a perspective view of the image acquisition device of FIG. 8.

The top face 31, 31' of each of the first flap 30 and of the second flap 30' here designates the face of each flap which is configured to support an image acquisition unit sensor, described in association with FIGS. 8 and 9 for example.

Thus, in the present exemplary embodiment, the top face 31 of the first flap 30' comprises a first sensor 55 of a first image acquisition unit 50, and the top face 31' of the second flap 30' comprises a second sensor 55' of a second image acquisition unit 50'.

The electronic support 20 further comprises at least one hinge 40.

The hinge links the first flap 30 and the second flap 30' to one another.

In other words, the hinge 40 is situated between the first flap 30 and the second flap 30'.

The hinge here designates a part of the electronic support 20 which is configured to be flexed, or curved, or folded, such that the top faces 31, 31' of the first flap and of the second flap form between them an angle "a" which is more visible in FIG. 3.

In particular, the angle "a" formed is greater than 180°.

Thus, when two image acquisition units 50, 50' are mounted on the electronic support 20, each image acquisition unit 50, 50' having a sensor 55, 55' mounted on one of the flaps 30, 30', then their optical axes diverge.

In other words, in a configuration in which the electronic support 20 is not folded, the top face 31 of the first flap 30 and the top face 31' of the second flap 30' here form an angle of 180°, whereas in a configuration in which the electronic support 20 is folded according to the invention, the top face 31 of the first flap 30 and the top face 31' of the second flap 30' here form an angle "a" greater than 180°.

For example, in the example illustrated, this angle "a" is, here, equal to 182.9°.

Moreover, the angle "a" formed between the flaps is preferably less than or equal to 220°.

The hinge 40 is, here, flexible, notably in comparison to the first flap 30 and the second flap 30'.

In the present exemplary embodiment, the hinge 40 is formed by a part of the electronic support 20 having a thickness that is thinner than the thickness of the first flap 30 or of the second flap 30'.

This makes it possible to create a weakened zone to orient one flap with respect to the other.

The hinge is further configured to electrically connect electronic components of the first flap 30 and of the second flap 30' to one another.

The electronic support 20 further comprises a connector 60.

The connector 60 is configured to allow an electrical connection between the electronic support 20 and an environment external to the electronic support 20.

The connector 60 notably here allows a transmission of at least one signal, such as an electrical power supply and/or a video signal for example.

The connector 60 is, here, arranged on the first flap 30, notably on its top face 31.

Having a single connector 60 for the entire electronic support 20 makes it possible to reduce the bulk of the electronic support, notably by minimising the number of electrical connections between the electronic support 20 and its external environment.

By centralising a transfer of signals, to or from the electronic support, a synchronisation of the signals can be processed in a component of the electronic support 20.

The hinge 40 here allows at least one transfer of the signals from the second sensor 55' of the second flap 30' to the first flap 30 comprising the connector 60, and thus avoids having one connector for each flap. The electronic support 20 further comprises a multiplexer 70.

The multiplexer 70 is configured here to multiplex video signals from the respective sensors 55, 55' of the first flap 30 and of the second flap 30'.

In this case, the multiplexer 70 is, here, arranged on the first flap 30, and notably on its bottom face 32.

The multiplexer 70 is in particular electronically linked to the connector 60, to the first sensor 55 and to the second sensor 55'.

Finally, the first flap 30 here comprises two fixing holes 80 and two centring holes 90. Similarly, the second flap 30' here also comprises two fixing holes 80' and two centring holes 90'.

Figure 4:
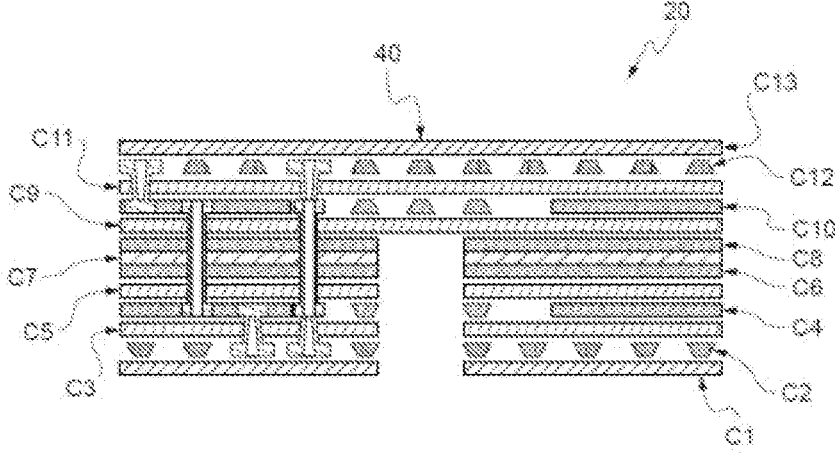
FIG. 4 represents a cross-sectional view of a detail, including the hinge, of the electronic support according to the exemplary embodiment of FIG. 1.

FIG. 4 represents a cross-sectional view of a detail of the electronic support 20 at the hinge 40 according to the exemplary embodiment of FIG. 1.

The electronic support 20 comprises several layers.

These layers are conventionally superposed and laminated, hot or cold, to form the body of the support.

As an example, the body of the electronic support 20 is, here, formed by eleven superposed layers, here denoted C2 to C12.

Furthermore, a layer C1 and a layer C13, disposed on either side, are, here, a solder mask, notably a photochemical liquid mask.

In this case, the layers C2, C4, C6, C8, C10 and C12 are copper based, notably with sheets of copper. The layers C2, C4, C6, C8, C10 and C12 are, here, notably etched by a photochemical method.

In this case, the layers C3, C5, C9 and C11 are dielectric based, notably pre-impregnated.

In this case, the layer C7 is, here, typically based on a glass fibre-reinforced epoxy resin composite of FR4 standard.

In this case, some of the layers C2 to C12 are, here, drilled to form at least one hole and the at least one hole formed is coated with copper to form a via allowing an electrical connection between the components disposed on either side of the body.

In the present exemplary embodiment, the first flap 30, the second flap 30' and the hinge 40 are formed from a single electronic circuit board body, i.e. from one and the same printed circuit board PCB.

Here, the hinge 40 is formed by a localised thinning of the body.

The thinner thickness of the hinge 40 is for example produced by material removal, for example machining or milling.

This material removal is, here, performed on a bottom face of the electronic support 20, i.e. a face from which the bottom face of the first flap and of the second flap are then formed.

This material removal here corresponds to a removal of the layers C1 to C8, so as to retain only the layers C9 to C13 at the hinge 40.

As an alternative to the material removal, the thinner thickness of the hinge 40 can be produced by a lamination method. For example, during a lamination of the body of the electronic support 20, the layers C9 to C12 are gripped between a first part and a second part, the first part corresponding to the layers C1 to C8 with an absence of material in a hinge zone and the second part corresponding to the thirteenth layer C13. Producing the thinner thickness of the hinge 40 by a lamination method makes it possible to obtain a hinge 40 of significantly cleaner appearance compared to a hinge 40 obtained by a material removal, notably by milling.

A locally thinner thickness thus makes it possible to create a special deformation zone in the body of the electronic support 20, forming the hinge 40.

Figure 5:
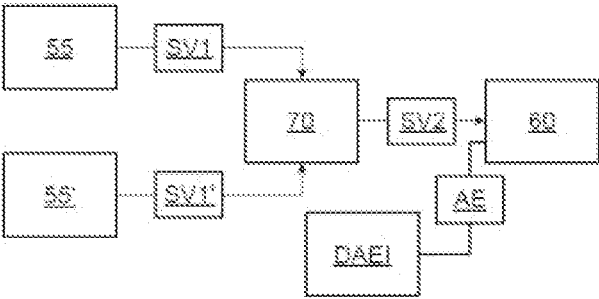
FIG. 5 represents an example of electronic architecture of the electronic support according to the exemplary embodiment of FIG. 1.

FIG. 5 represents an electronic architecture of the electronic support 20 according to the exemplary embodiment of FIG. 1.

The electronic architecture of the electronic support 20 shows notably an interaction between the sensors 55 and 55' and the multiplexer 70.

The sensors 55 and 55' here each transmit a video signal, respectively denoted SV1 and SV1', to the multiplexer 70.

The electronic architecture of the electronic support 20 notably shows an interaction between the multiplexer 70 and the connector 60.

The multiplexer 70 processes the signals SV1 and SV1' received, and in turn transmits a multiplexed video signal SV2 to the connector 60.

The electronic architecture of the electronic support 20 notably shows that the connector 60 allows an internal distribution of an electricity supply, denoted DAEI, for the electronic support 20, by the transfer of an electrical power supply denoted AE, originating from an external environment, to each electronic component of the electronic support 20, including to the first sensor 55, the second sensor 55' and the multiplexer 60.

Figure 6:
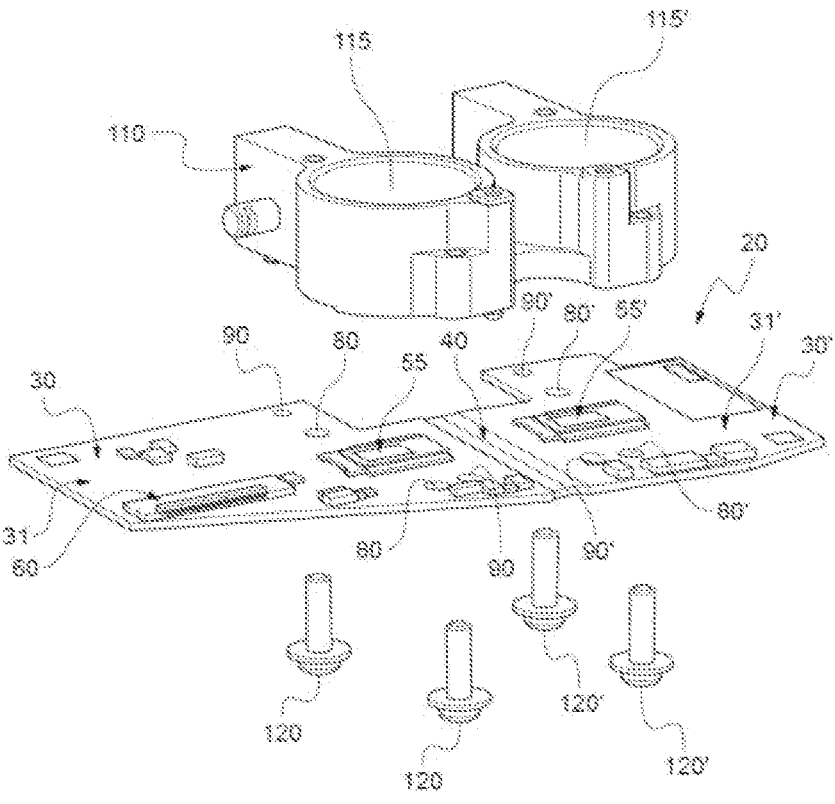
FIG. 6 represents a perspective top view of an assembly comprising the electronic support according to the exemplary embodiment of FIG. 1.
Figure 7:
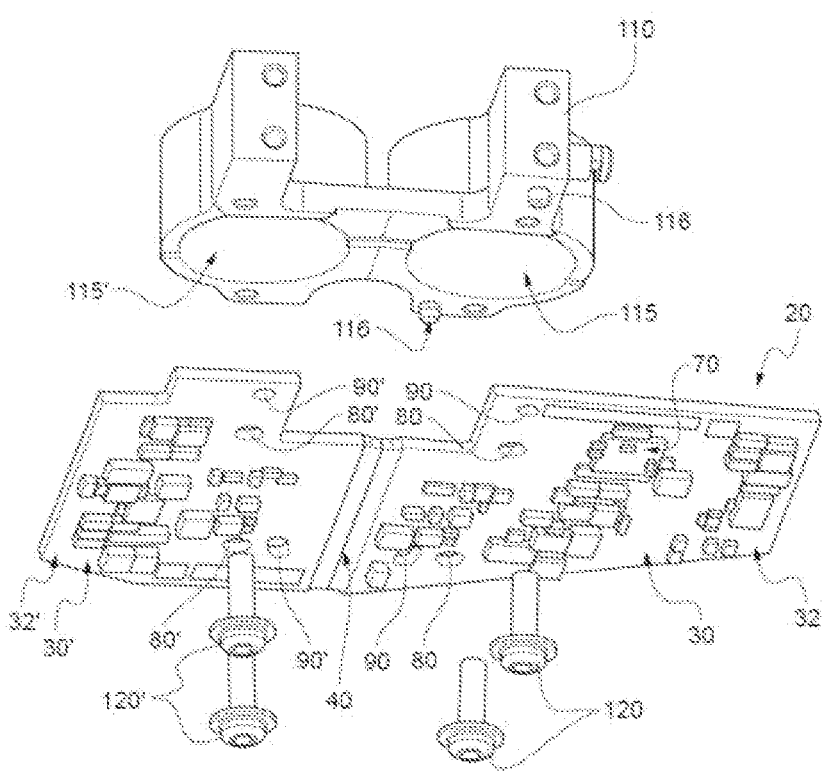
FIG. 7 represents a perspective bottom view of the assembly of FIG. 6.

FIGS. 6 and 7 represent a top view and a bottom view, in perspective, of an assembly forming the electronic support 20 as described previously.

The assembly here further comprises a lens support 110. The lens support 110 is configured here to support two lenses: a first lens 56 of the two lenses being that of a first image acquisition unit 50 and a second lens 56' of the two lenses being that of a second image acquisition unit 50'.

To these ends, the lens support 110 here comprises a first sheath 115, configured to support the first lens 56, and a second sheath 115', configured to support the second lens 56'.

The lens support 110 is also configured to position the first lens 56 and the second lens 56' with respect to the corresponding image acquisition unit sensor 55, 55' in order for a first image captured by the first image acquisition unit 50 and a second image captured by the second image acquisition unit 50' to be focused on the first sensor 55 and the second sensor 55', respectively.

The lens support 110 is, here, arranged on the top face 31 of the first flap 30 and on the top face 31' of the second flap 30', and straddles the hinge 40.

The lens support 110 is further, here, configured to keep the hinge 40 folded such that the top face 31 of the first flap 30 and the top face 31' of the second flap 30' forms the desired angle "a".

The angle "a" is notably chosen to avoid, above a certain threshold value of the angle "a", dependent on the characteristics of the lens and of the sensor of each image acquisition unit, having the field of the at least one first image acquisition unit being separated from that of the at least one second image acquisition unit, so as to avoid having a dead zone appear and guarantee an overlapping of the two visual fields.

For example, the first sheath 115 is fixed with respect to the second sheath 115'.

The lens support 110 here further comprises two centring pins 116.

The two centring pins 116 are, here, configured to centre the lens support 110 on the body of the electronic support 20.

The two centring pins 116 are arranged on a bottom face of the lens support 110, intended to come onto the top face of the body of the electronic support 20.

In the present exemplary embodiment, the two centring pins 116 are formed protruding from the bottom face of the lens support 110, and in particular in a wall of the first sheath 115.

The two centring pins 116 are therefore here configured to centre the lens support 110 on the electronic support 20 by being inserted into the two centring holes 90 of the first flap 30.

Obviously, at least one of the two centring pins 116 could be formed protruding from the bottom face of the lens support 110, in a wall of the second sheath 115', and come to be inserted into a centring hole 90' provided for this purpose in the second flap 30'.

The assembly further here comprises four fixing screws 120, 120'.

The four fixing screws 120, 120' are, here, configured to hold the lens support 110 on the electronic support 20.

Two fixing screws 120 are, here, screwed through two fixing holes 80 of the first flap 30 to the bottom face of the lens support 110, notably by being aligned with the first sensor 55 to optimise the holding of the lens support 110 on the first flap 30.

Two other fixing screws 120' are, here, screwed through two fixing holes 80' of the second flap 30' to the bottom face of the lens support 110, notably by being aligned with the second sensor 55' to optimise the holding of the lens support 110 on the second flap 30'.

FIGS. 8 and 9 represent perspective views of an image acquisition device 130 comprising an assembly as described previously.

The image acquisition device 130 is configured to acquire at least one image on a visual axis D1 (illustrated in FIG. 9).

The image acquisition device 130 here comprises the first image acquisition unit 50 and the second image acquisition unit 50'.

The first image acquisition unit 50 comprises the first lens 56 and the first sensor 55, which together define an optical axis D2.

The second image acquisition unit 50' comprises the second lens 56' and the second sensor 55', which together define an optical axis D3.

The optical axes D2, D3, respectively of the first and second image acquisition units 50, 50', diverge with respect to the visual axis D1 of said image acquisition unit 40 according to a separation angle of a predetermined value.

In other words, a separation distance, between each optical axis D2, D3 and the visual axis D1, increases when a distance, on each optical axis D2, D3, with respect to each sensor 55, 55' increases.

Furthermore, an angle "b" (not represented) between the optical axis D2 and the optical axis D3 is substantially equal to: b=a−180°.

In an exemplary embodiment considered here, the first image acquisition unit 50 and the second image acquisition unit 50' are, here, configured so that, in far field mode, that is say at at least 1 m, even 1.2 m, an image resolution on the corresponding sensor makes it possible to recognise an iris of an individual, that is to say that an iris of 10.2 mm diameter is imaged by at least 150 pixels, even at least 160 pixels.

Moreover, the first image acquisition unit 50 and the second image acquisition unit 50' are, here, configured so that, in near field mode, that is to say at most 1 m, even at most approximately 0.5 m, a lateral field of the two image acquisition units 50, 50' combined makes it possible to capture the two eyes of an individual, with a margin allowing for an aiming defect.

The lenses 56, 56' of the first and second image acquisition units 50, 50' are chosen to have a focal distance lying between 35 mm and 60 mm, for example of approximately 50 mm.

Thus, the electronic support 20 according to the invention makes it possible to tilt, notably diverge, the optical axes D2, D3 of the at least two image acquisition units 50, 50' with respect to a visual axis D1 of the image acquisition device 130.

The optical axes D2, D3 are for example symmetrical with respect to the visual axis D1, which can then be qualified as "median".

In other words, such an electronic support 20 makes it possible for the at least two image acquisition units 50, 50' to be able to cover a wider image capture field compared to a configuration in which the at least two image acquisition units 50, 50' would not be inclined with respect to one another.

According to one option, the image acquisition device 130 further here comprises a translation device (visible in FIG. 9).

The translation device is configured to focus an image on the sensors.

The translation device is, here, configured to simultaneously translate the respective lens 56, 56' of each of the first and second image acquisition units 50, 50' by a single translational movement, parallel to the visual axis D1.

In the exemplary embodiment represented here, the translation device comprises a runner, a worm screw and a stepper motor.

The stepper motor is configured to turn the worm screw, which drives the runner in translation on the axis D1.

The invention claimed is:

1. An electronic support comprising:
   a body which includes at least one first flap and one second flap, the first flap and the second flap each having a top face and a bottom face, the top face of the first flap and the top face of the second flap being configured to each support an image acquisition circuitry having a sensor, the electronic support further having at least one hinge, the at least one hinge being configured to link the first flap and the second flap to one another, the top face of the first flap being inclined by an angle "a" with respect to the top face of the second flap, the angle "a" being greater than 180°, wherein
   the at least one hinge is further configured to transfer a video signal between the first flap and the second flap,
   the body includes a printed circuit board having a plurality of layers,
   the at least one hinge has a thickness that is thinner than a thickness of the at least one first flap and one second flap, and
   the at least one hinge is formed by a local thinning of the printed circuit board, such that the first flap, the second flap, and the at least one hinge are formed as a single piece.

2. The electronic support according to claim 1, wherein the at least one hinge is flexible.

3. The electronic support according to claim 1, wherein at least one flap out of the first flap and the second flap includes a connector configured to electrically connect the electronic support to an external device.

4. The electronic support according to claim 3, wherein at least one flap out of the first flap and the second flap includes a multiplexer configured to multiplex video signals originating from sensors of the first flap and of the second flap and to transmit a single video signal to said connector.

5. The electronic support according to claim 1, wherein the electronic support is a printed circuit board.

6. An assembly comprising:
   an electronic support according to claim 1; and
   a lens support configured to support at least one first lens of a first image acquisition circuitry and one second lens of a second image acquisition circuitry, and configured to position at least the first lens of the first image acquisition circuitry facing a first sensor of the first image acquisition circuitry and the second lens of the second image acquisition circuitry facing a second sensor of the second image acquisition circuitry, the lens support being further fixed to the first flap and the second flap by keeping the first flap inclined by the angle "a" with respect to the second flap.

7. An image acquisition device configured to acquire at least one image on a visual axis, the image acquisition device comprising:
   an assembly according to claim 6 and the first image acquisition circuitry and the second image acquisition circuitry,
   the first image acquisition circuitry including a first lens and a first sensor, which together define a first optical axis, and
   the second image acquisition circuitry including a second lens and a second sensor, which together define a second optical axis, the first and second optical axes, respectively of the first image acquisition circuitry and second image acquisition circuitry, diverging with respect to one another.

8. The electronic support according to claim 2, wherein the at least one hinge has a thickness that is thinner than a thickness of the at least one first flap and one second flap.

9. The electronic support according to claim 2, wherein the first flap and the second flap are formed together of a single piece.

10. The electronic support according to claim 1, wherein the first flap and the second flap are formed together of a single piece.

11. The electronic support according to claim 2, wherein the at least one hinge is further configured to electrically connect the first flap and the second flap to one another.

12. The electronic support according to claim 1 wherein the at least one hinge is further configured to electrically connect the first flap and the second flap to one another.

13. The electronic support according to claim 1, wherein the at least one hinge is further configured to electrically connect the first flap and the second flap to one another.

14. The electronic support according to claim 2, wherein at least one flap out of the first flap and the second flap includes a connector configured to electrically connect the electronic support to an external device.

15. The electronic support according to claim 1, wherein at least one flap out of the first flap and the second flap includes a connector configured to electrically connect the electronic support to an external device.

16. The electronic support according to claim 1, wherein at least one flap out of the first flap and the second flap includes a connector configured to electrically connect the electronic support to an external device.

* * * * *